United States Patent [19]

Schneider et al.

[11] Patent Number: 4,875,561
[45] Date of Patent: Oct. 24, 1989

[54] DUAL CLUTCH APPLICATION AREA AND CONTROL

[75] Inventors: Karl F. Schneider; William J. Haley, both of Ithaca, N.Y.; Alan L. Miller, Chicago, Ill.

[73] Assignee: Borg-Warner Automotive, Inc., Troy, Mich.

[21] Appl. No.: 107,143

[22] Filed: Oct. 9, 1987

[51] Int. Cl.⁴ .................. B60K 41/02; F16D 25/14
[52] U.S. Cl. ........................... 192/0.033; 192/0.076; 192/85 AA; 192/103 F
[58] Field of Search .............. 192/0.033, 0.076, 103 F, 192/85 AA

[56] References Cited

U.S. PATENT DOCUMENTS

| | | |
|---|---|---|
| 3,262,531 | 7/1966 | Black et al. ............... 192/85 AA |
| 3,273,415 | 9/1966 | Frost ..................... 192/85 AA X |
| 3,753,478 | 8/1973 | Shiber .................... 192/85 AA |
| 4,147,245 | 4/1979 | Folomin et al. ........... 192/85 AA |
| 4,361,217 | 11/1982 | Bieber et al. ............ 192/103 FA |
| 4,558,772 | 12/1985 | Grimes et al. ............ 192/0.076 |
| 4,648,496 | 3/1987 | Petzold et al. ........... 192/0.076 |
| 4,664,242 | 5/1987 | Downs .................... 192/85 AA |
| 4,757,886 | 7/1988 | Brown et al. ............. 192/103 F |

FOREIGN PATENT DOCUMENTS 2027413 12/1971 Fed. Rep. of Germany ... 192/103 F
60-263730 12/1985 Japan ........................... 192/85 AA

OTHER PUBLICATIONS

Werter P. Petzold et al., U.S. patent application Ser. No. 25,391 filed Mar. 13, 1987 for "Continuously Variable Transmission Clutch Control System".

Primary Examiner—Rodney H. Bonck
Assistant Examiner—David A. Testardi
Attorney, Agent, or Firm—Robert L. Zieg; James J. Jennings; James A. Geppert

[57] ABSTRACT

An adaptive clutch torque capacity control for an automotive vehicle clutch utilizing a dual area apply piston for engagement of the clutch plate for accurate control over a larger than normal torque range. The use of two piston areas allows one area to be controlled in a "coarse" fashion, while the other piston area, which is generally a small area, provides a "vernier" or fine adjustment control. The small area piston is controlled by an electronic closed loop for fine adjustment of any errors occurring in the "coarse" control.

14 Claims, 4 Drawing Sheets

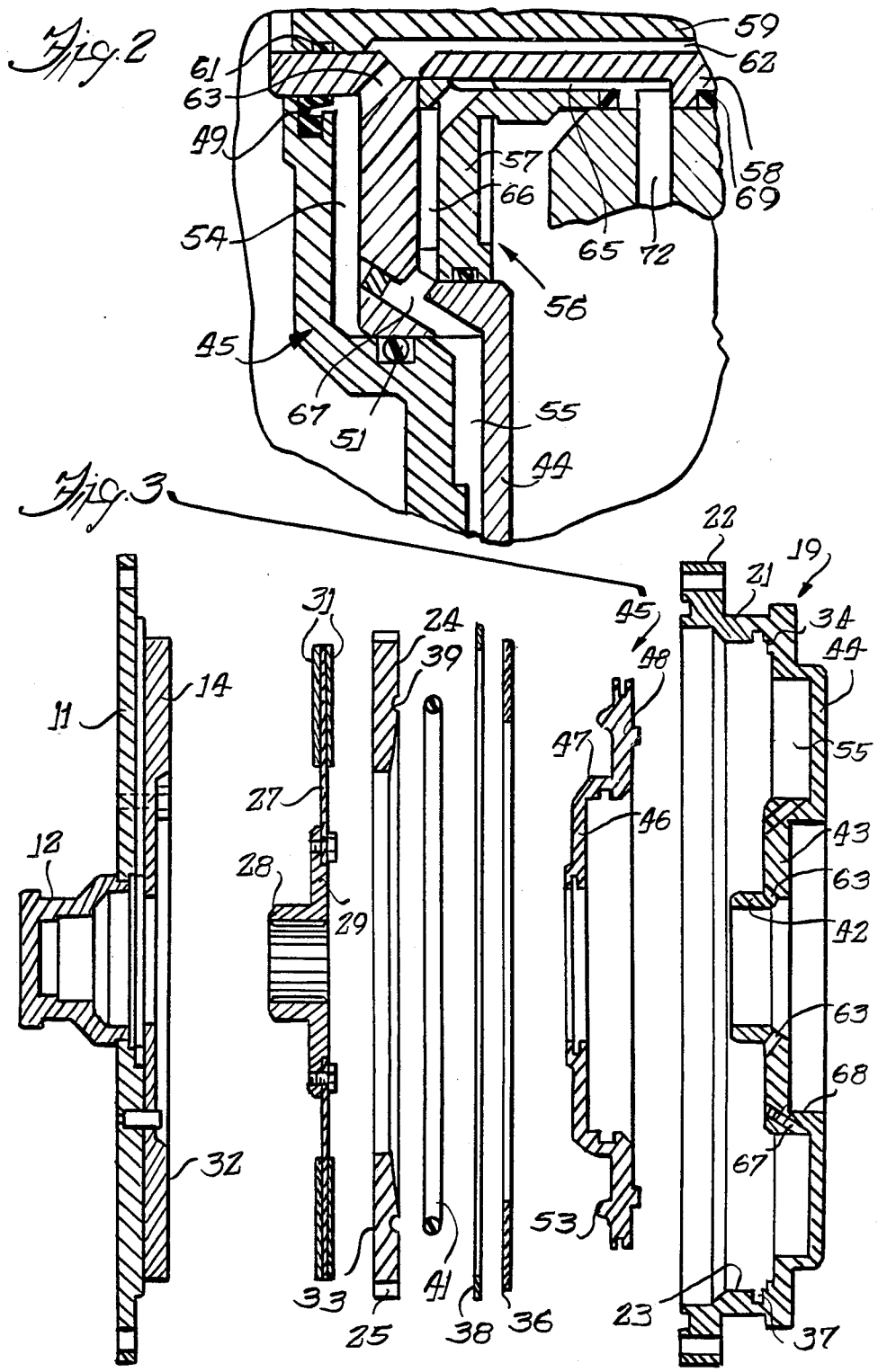

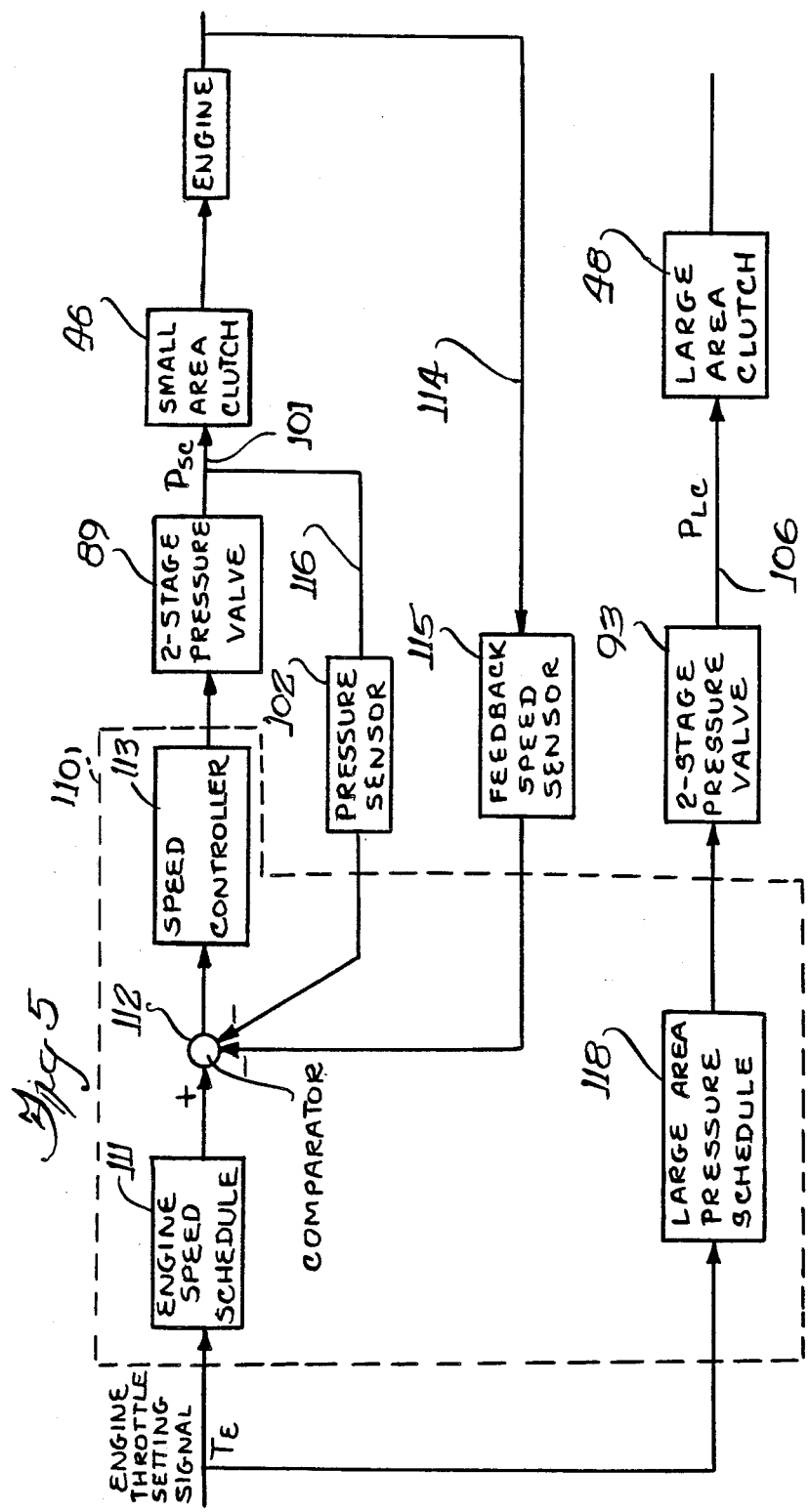

DUAL CLUTCH APPLICATION AREA AND CONTROL

BACKGROUND OF THE INVENTION

In a conventional reciprocating piston, internal combustion engine, torque is near zero at low engine output speed and peaks somewhere in the middle of the engine operating range and then decreases as output speed further increases. On the other hand, a gas turbine engine has very high torque at low engine speeds.

To provide a friction start clutch in a transmission for a high torque engine, such as a gas turbine engine, one would need a very wide range of torque capacity, and thus, a very high capacity clutch. A single large clutch piston would require a clutch piston apply area having sensitivity at a high level. If 100 psi were necessary to apply the clutch, a 1.0 psi variation in pressure would result in a large torque variation which would be objectionable at light throttle starts. Such an adjustment to provide adequate clutch apply pressure would not provide a controllable sensitivity.

The present invention provides a novel clutch arrangement and control strategy for transmission starting in a high torque engine.

SUMMARY OF THE INVENTION

The present invention relates to a novel starting for a high torque engine utilizing a clutch and control strategy therefor wherein as the throttle for the engine provides an engine torque, a torque is also applied to the clutch to balance the engine torque and provide a desired engine speed. As torque is applied to the inlet clutch side, the engine is accelerating so that the clutch slips and additional torque is applied to the clutch until the input side and the output side of the clutch are synchronized as the torque is balance which is lock-up. A closed loop speed control acts to control the clutch torque while maintaining engine speed.

The present invention also relates to a novel clutch arrangement and clutch control stategy for transmission starting in a high torque engine, such as a gas turbine engine for utilization in an automobile. The clutch arrangement comprises a single piston having a relatively small apply area and a separate relatively large apply area to actuate the pressure plate for engagement of the clutch plate. Each clutch piston area is defined by a hydraulic fluid chamber having a separate source of pressure from a control system. For low torque clutch apply, only the small piston area would be used controlled by a fast response system. For higher torque clutch apply, the large piston area would have pressure coarsely controlled to provide a torque capacity somewhat less than needed overall. The small piston area with its very fast and accurate control system would then supply the added torque capacity to produce the closely controlled net overall torque requirement.

The present invention further relates to a novel clutch arrangement having a clutch control strategy wherein a fast response closed loop electro-hydraulic system controls the hydraulic pressure to the small piston apply area and a coarsely controlled hydraulic pressure for the large piston apply area. The small piston area would be controlled by the electronic closed loop to finely adjust any errors of the coarse control.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged cross sectional view of the encircled portion of FIG. 1.

FIG. 3 is an exploded cross sectional view of the clutch assembly of FIG. 1.

FIG. 5 is a schematic showing of a control system for clutch actuation.

DESCRIPTION OF THE PREFERRED EMBODIMENT

Figure 1:
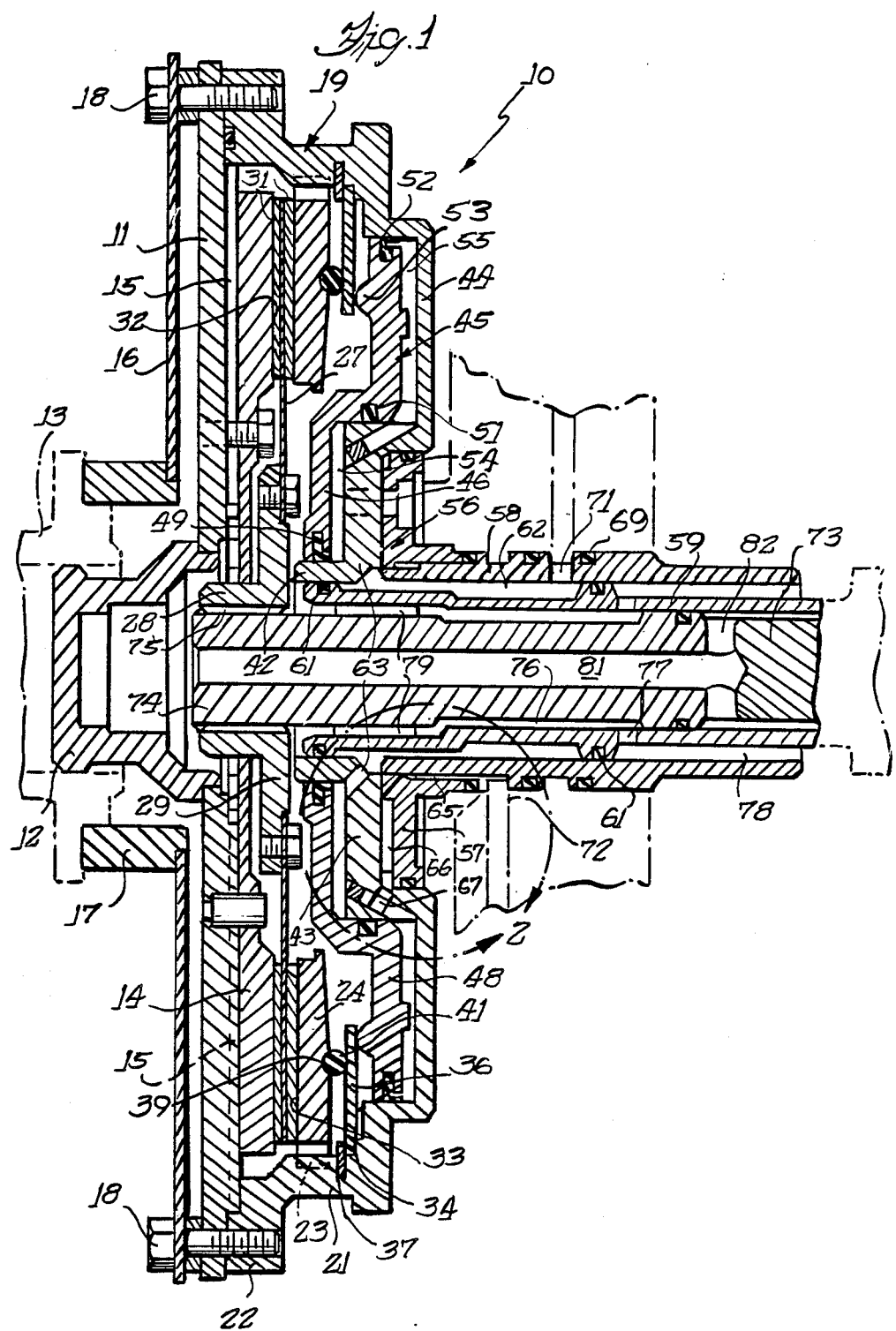
FIG. 1 is a cross sectional view of a friction clutch assembly utilizing the two apply area piston of the present invention.

Referring more particularly to the disclosure in the drawings wherein is shown an illustrative embodiment of the present invention, FIG. 1 discloses a friction clutch assembly 10 for use with a gas turbine or similar high torque engine in a vehicle, such as an automobile, for control of the torque transmitted from the engine to drive the wheels of the vehicle. This assembly provides a clutch application strategy where the torque capacity must be controlled to a very small percent of the overall clutch capacity.

The clutch assembly includes a cover plate 11 mounted on a central pilot 12 extending into the engine drive shaft 13 and a reaction plate 14 abuts the cover plate and is secured thereto by bolts 18. Grooves 15 are formed in the cover plate 11 to provide exhaust passages a will be later described. A flexplate 16 on a hub 17 is secured to the engine drive shaft 13 parallel to and is also secure in spaced relation to the cover plate 11 by bolts 18. A clutch cover 19 is further secured to cover plate 11 to house the internal clutch structure. The cover includes an axially extending wall 21 terminating in a radial flange 22 secured to the periphery of the cover plate by bolts 18. The wall 21 also has a splined portion 23 engaging the splined periphery 25 (FIG. 3) of an annular pressure plate 24 for rotation together.

A clutch plate 27 is secured to the radial flange 29 of a hub 28 received within a central opening in the reaction plate 14, the clutch plate having friction facings 31 secured to the periphery thereof and located between facing surfaces 32 and 33 of the reaction plate 14 and pressure plate 24, respectively. A Belleville spring 36 is pivotally mounted in a corner 34 of the cover 19 and is retained therein by a snap ring 38 mounted in a groove 37 in the cover. The Belleville spring bears on an annular pressure ring 41 received in a complementary groove 39 formed in the surface of the pressure plate 24 opposite to surface 33.

The clutch cover also includes a portion 43 extending radially from an inner hub 42 and an annular recessed portion 44 between the flange 43 and corner 34. A single, unitary piston 45 has an inner radial portion defining a small piston area 46 opposite flange 43, an intermediate shoulder 47 and an outer radial portion defining a large piston area 48 received in the chamber 55 defined by recessed portion 44; the piston having an inner sealing ring 49 engaging the hub 42 and an intermediate ring 51 and outer ring 52 engaging the chamber 55. A fulcrum ridge or surface 53 on the outer radial piston portion engages the inner peripheral edge of the Belleville spring 36 extending radially inwardly of the pressure ring 41.

The inner radial portion of the piston provides the small apply area 46 in a first chamber 54, and the outer radial portion provides the large apply area 48 in a second chamber 55. A clutch hub 56 having a radial flange 57 fitting within a recess defined by the exterior surface of recessed portion 44 and abutting the flange 43 of hub 42 has a clutch hub shaft 58 secured thereto and extending rearwardly towards the vehicle transmission (not shown). A stationary sleeve shaft 59 is sealingly received in the clutch hub shaft 58 through axially spaced sealing rings 61 to define an annular flow passage 62 communicating with angularly disposed ports 63 in the clutch cover hub 42 leading to the chamber 54. Also formed between the clutch hub 56 and the clutch hub shaft 58 is a flow passage 65 leading to one or more radial passages 66 formed between the hub flange 57 and radial flange 43 of the cover and communicating with passages 67 in the shoulder 68 defining the recessed portion 44 and leading to the large chamber 55. A port 71 communicates with annular passage 62 and a second port 72 communicates with passage 65, the ports being sealingly separated by three seal rings 69.

A transmission input shaft 73 extends through the sleeve shaft 59 to terminate in a splined forward end 74 received in the splined opening 75 in the clutch plate hub 28. An inner annular passage 76 is formed between the input shaft 73 and sleeve shaft 59 to communicate through radial ports 77 with an outer annular passage 78 between the sleeve shaft 59 and clutch hub shaft 58, which in turn is connected to a source of clutch cooling oil. The input shaft 73 is rotatably mounted in the sleeve shaft 59 by bearings 79 through which cooling oil flows to the interior of the clutch. Once the oil has moved radially past the friction facings, it is returned to a sump through radial passages 15 to a central passage 81 in shaft 73 and radial ports 82 to an annular clearance between shafts 59 and 73 to exit from openings rearwardly of the clutch hub shaft 58.

Figure 4:
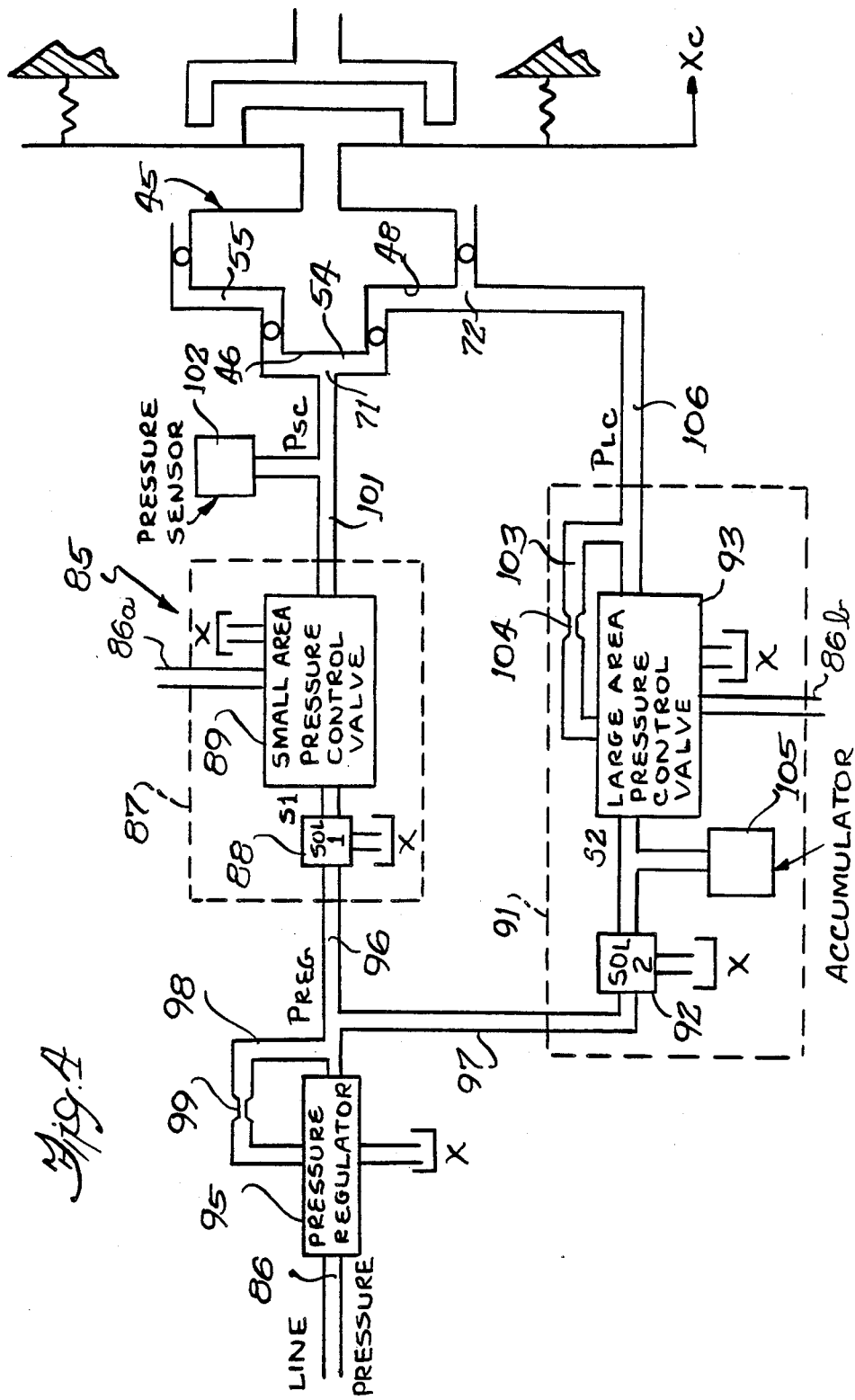
FIG. 4 is a schematic showing of the hydraulic system utilized for clutch actuation.

FIGS. 4 and 5 disclose more detailed schematic arrangements of the hydraulic control system for the clutch piston and the electronic control system for the clutch. As shown in FIG. 4, the hydraulic system for clutch control includes a pair of electro-hydraulic control valves, which valves have two stages. The first or pilot stage is a high response solenoid on/off valve that operates in a pulse-width modulated (PWM) mode, and the second stage is a spool valve for actually controlling or regulating the pressure to either chamber of the clutch. FIG. 4 discloses the hydraulic system 85 which includes apply systems 87 and 91 coupled to the line pressure inlet 86 and branch lines 86a and 86b wherein the hydraulic pressures delivered to the two clutch chambers 54 and 55 are controlled with pulse-width-modulated (PWM) solenoid valves 88 and 92. The PWM duty cycle for each solenoid is calculated by an electronic control unit every five milliseconds.

Primary control of the clutch is provided by the pressure delivered to the chamber 54 defining the small area 46 of the clutch piston 45. Under high throttle starting conditions, a bias pressure is applied to the chamber 55 defining the large piston area 48. The pressure levels of the hydraulic fluid delivered to the large and small piston areas are controlled with two three-way spool valves 89 and 93 driven by the PWM solenoid valves 88 and 92, respectively. Line pressure from inlet 86 passes through a pressure regulator 95 with the regulated pressure $P_{REG}$ being fed through branches 96 and 97 to the solenoid valves 88 and 92; a feedback loop 98 having an orifice 99 feeds back to the pressure regulator. The small clutch pressure $P_{SC}$ provided by the valve 89 from line pressure in line 86a is passed through line 101 to the port 71 leading into the small chamber 54, a pressure sensor 102 communicating with pressure line 101. The small piston area control valve 89 is an open-center valve with no hydraulic feedback. The control software generating the PWM duty cycle for the solenoid valve 88 driving the small area control valve 89 includes feedback compensation of errors between the measured pressure in the small area of the piston and the pressure command from the pressure control strategy.

The large piston area control valve 93 is a closed center valve with hydraulic feedback through loop 103 which may contain an orifice 104 for damping. The control software computes the PWM duty cycle for the solenoid valve 92 driving the control valve 93 based on the pressure command indicated by the pressure control strategy directly. An accumulator 105 communicates with the line 97 between solenoid valve 92 and control valve 93 with the pulse-width-modulated pilot pressure for the control valve 93 minimizing the pressure ripple caused by the PWM signal. The large clutch pressure $P_{LC}$ provided by valve 93 from line pressure in line 86b passes through line 106 to the port 72 leading to chamber 55.

The bias pressure for the large piston area is passed through a first-order lag circuit (not shown) before issuing the large area pressure command to avoid any sudden changes in clutch pressure. Both the bias set point and the lag frequency are a function of the throttle sensor voltage signal. The small area clutch torque command is equal to the desired clutch torque minus the expected torque generated as a result of the large piston area pressure command. This torque command is transformed into a small piston pressure command. The pressure command to the small piston area control valve is the sum of the pressure required to maintain the clutch touch-off position and the incremental pressure required on the small piston area to generate the commanded clutch torque.

FIG. 5 is a block diagram of the control system for the clutch which is based on controlling the speed of the high torque engine or turbine for clutch control. A signal $T_E$ for the engine throttle setting is fed to a microcomputer 110 including an engine operating map or speed schedule 111 containing data for engine stall at various throttle settings. The operating map provides a speed set point to a comparator 112 leading to a controller 113, both in the microcomputer 110, the controller providing a signal to the two-stage pressure valve 89. The pressure setting from this valve is provided to the small clutch piston area 46 through line 101 and port 71. The clutch engagement due to the pressure developed in chamber 54 causes the engine speed to decrease and the change in engine speed provides a signal through a feedback loop 114 having a speed sensor 115. This signal is compared in comparator 112 with the stall speed set point, which in turn provides an altered output signal to the controller 113 to adjust the pressure valve 89. Also, a second feedback loop 116 having the pressure sensor 102 takes the pressure signal from the valve 89 and provides a secondary closed loop for a signal to the comparator. As the clutch is applied by the pressure from the control valve 89, the engine speed initially increases and then levels off while the vehicle speed increases in a linear fashion until it intersects the engine speed. This is clutch lock-up.

Likewise the dual area pressure valve 93 is actuated once the small piston area 46 has completed clutch engagement. This provides pressure to the large piston chamber 55 upon an increase in engine speed by depressing the throttle. The large area 48 receives a pressure $P_{LC}$ from valve 93 based on a large area pressure schedule 118, also a part of microcomputer 110, and provides a coarse torque adjustment through line 106 and port 72 to the large clutch area 48 for the clutch control once initial smooth engagement of the clutch has been achieved. For a heavy throttle, the controller will switch to the large piston area 48 in chamber 55 to give the clutch its full capacity as required.

The small piston area 46 is the "vernier" area which overcomes the force of the Belleville spring 36, and the larger piston area 48 is the main apply area. This arrangement allows an accurate smooth takeoff from a vehicle stop and provides the capability for high torque with the large piston area.

We claim:

1. A clutch assembly for actuation of a transmission for an engine having a relatively high torque at low output speed, comprising a dual area clutch having a single apply piston in which is incorporated a small apply area and a large apply area, separate sources of hydraulic pressure for the small apply area and the large apply area, and a control arrangement for controlling the two separate sources of hydraulic pressure to the single apply piston to initially apply pressure to the small apply area followed by application of a second pressure of a higher value to the large apply area.

2. A clutch assembly as set forth in claim 1, wherein said clutch assembly includes, a clutch cover and cover plate providing an enclosure, a clutch plate within the enclosure operatively connected to a transmission input shaft, an annular pressure plate and a reaction plate within said enclosure on opposite sides of the clutch plate operatively connected to said engine, a unitary clutch piston having a fulcrum surface and divided into said small apply area and said large apply area, and a diaphragm spring between said piston and pressure plate having an outer edge pivotally mounted in said clutch cover.

3. A clutch assembly as set forth in claim 2, in which said diaphragm spring has an inner edge, an outer edge and a central portion, said inner edge engaging said piston fulcrum surface and the central portion engaging a fulcrum surface on said pressure plate.

4. A clutch assembly as set forth in claim 2, in which said clutch cover is provided with a stepped pressure chamber and said piston has a stepped configuration with an intermediate shoulder separating the small and large apply areas.

5. A clutch assembly as set forth in claim 4, including sealing means on the inner and outer peripheries and the intermediate shoulder of said piston cooperating with said clutch cover to isolate said large and small apply areas.

6. A clutch assembly as set forth in claim 5, including a passage leading to the chamber for the small apply area and a separate passage leading to the chamber for the large apply area.

7. A clutch assembly as set forth in claim 1, wherein said control arrangement comprises a source of hydraulic pressure leading to two pressure lines, a first control valve in the pressure line leading to the small piston area, and a second control valve in the pressure line leading to the large piston area.

8. A clutch assembly as set forth in claim 7, in which said first valve includes a three-way spool valve driven by a solenoid valve.

9. A clutch assembly as set forth in claim 7, in which said second valve includes a three-way spool valve driven by a solenoid valve.

10. A clutch assembly as set forth in claim 9, including an accumulator between said solenoid valve and spool valve.

11. A control system for a two-area vehicle clutch piston in a vehicle driveline between an engine and a transmission having separate pressure sources to a small piston area and a separate large piston area, comprising a microcomputer including a vehicle engine operating map, means for comparing a signal from the operating map with a signal of actual engine speed, a controller adapted to receive a signal from the comparing means, a two-stage pressure valve receiving a signal from the controller, said valve providing a pressure signal to the small piston area, an engine speed feedback loop indicating clutch engagement to said comparing means, and an open loop for the large piston area comprising a second engine operating map and a second two-stage pressure valve receiving a signal from the second operating map and providing a pressure signal to said large piston area.

12. A control system as set forth in claim 11, wherein a pressure feedback loop receives a pressure signal from said two-stage valve and feeds that signal to the comparing means.

13. A control system as set forth in claim 11, wherein each said first and second pressure valves includes a solenoid valve for actuation thereof.

14. A control system as set forth in claim 13, in which said solenoid valves are pulse-width modulated valves.

* * * * *